United States Patent [19]

Kim

[11] Patent Number: 4,462,334

[45] Date of Patent: Jul. 31, 1984

[54] SOLAR ANIMAL STRUCTURE

[76] Inventor: Ho K. Kim, 2107 Somerset Dr., Wilson, N.C. 27893

[21] Appl. No.: 409,540

[22] Filed: Aug. 19, 1982

[51] Int. Cl.³ ..................... A01K 1/00; A01K 31/20; A24J 3/02

[52] U.S. Cl. ..................................... 119/16; 119/21; 126/431

[58] Field of Search ............... 126/431, 430, 436, 432, 126/452; 119/16, 21

[56] References Cited

U.S. PATENT DOCUMENTS

| | | | |
|---|---|---|---|
| 2,559,869 | 7/1951 | Gay | 126/431 |
| 4,000,851 | 1/1977 | Heilemann | 126/431 |
| 4,006,856 | 2/1977 | Nilsson | 126/431 |
| 4,051,891 | 10/1977 | Harrison | 126/431 |
| 4,051,999 | 10/1977 | Granger et al. | 126/431 |
| 4,201,192 | 6/1980 | Coxon et al. | 126/430 |

*Primary Examiner*—Hugh R. Chamblee
*Attorney, Agent, or Firm*—Mills & Coats

[57] ABSTRACT

The present invention entails an animal housing structure equipped with a solar heating system for heating the structure. Solar energy is collected by a roof-attic solar collector arrangement and the collected solar energy in the form of heat is transferred to passing air. The heated passing air is selectively directed to the ground underlying the structure and is channeled generally horizontally through the underlying ground at a selected depth below ground level. Heat from the air is transferred to the earth below ground level and this heat is then slowly transferred upwardly through the ground towards ground level where it is ultimately emitted from the earth and acts to heat the interior of the structure and provide warmth for the animals.

10 Claims, 2 Drawing Figures

SOLAR ANIMAL STRUCTURE

FIELD OF INVENTION

The present invention relates to solar energy structures and to solar energy structures in the field of animal husbandry, and more particularly to a heating system for an animal structure that collects solar energy and transfers the same into the ground underlying the structure after which the transferred heat is slowly transferred upward to ground level where the heat is ultimately emitted therefrom to heat the structure.

BACKGROUND OF INVENTION

Because of the scarcity of petroleum fuels and their costs and the prospects for continued rising costs, much attention lately has been directed at solar energy and its possible applications for providing needed energy. As a result solar energy has been successfully used in a wide variety of applications ranging from residential heating to drying agricultural products.

In the area of animal husbandry and heating animal housing structures, it would seem that solar energy would have significant potential. In this regard, consider poultry production for example. The production of poultry requires a source of energy for maintaining a suitable environmental temperature within the poultry housing structure during most of the year in certain regions throughout the United States.

Prior to the energy crisis and the beginning of substantial rises in cost in petroleum fuels, a conventional broiler house was built at a relatively low cost and had a minimum amount of insulation. Over the past few years the increase in the price of energy, feed, gas and electricity has dictated a change in housing designs. Now one finds poultry production structures with greater insulation and with automatic control ventilation. As contrasted to poultry houses of twenty years ago, poultry structures today tend to be totally enclosed with significant automatic environmental controls provided.

Presently, most of the energy for maintaining poultry house temperature during the first few weeks of a bird's life is provided by fossil fuel-liquefied petroleum gas (LPG). As the bird gets older, the natural heat from the bird's body becomes greater and eventually this becomes a major source for heating the production house.

Therefore, there is and continues to be a need for energy efficient housing structures for animals such as broilers.

SUMMARY AND OBJECTS OF THE INVENTION

The present invention entails a method and apparatus for utilizing solar energy to heat an animal housing structure such as a broiler house. Of principal importance in the present invention is the provision of a simple, relatively efficient and effective design for collecting solar energy and utilizing that solar energy to heat an animal housing structure.

Disclosed herein is a system for collecting solar energy from the roof-attic of an animal housing structure and directing that solar energy in the form of heat associated with a system of air to the ground underlying the structure. The heated air is directed generally horizontally through the ground underlying the structure at a selected depth or depths. As the heated air passes underground, heat therefrom is transferred to the surrounding earth and ultimately this heat moves upward through the earth towards ground level where it is emitted therefrom to heat the structure and to keep animals warm such as broilers.

Under certain conditions, it becomes advantageous and desirable to effectively store portions of the collected solar energy. To accomplish this, the solar energy collecting and heating system of the present invention is designed so that selective quantities of collected solar energy in the form of heat may be readily stored in the ground or earth underlying the structure where the same can be efficiently used at some later time.

It is, therefore, an object of the present invention to provide a solar heating system for an animal housing structure that is efficient and effective.

Another object of the present invention resides in the provision of a solar heating system for an animal housing structure which is relatively simple in design and which can be constructed inexpensively.

A further object of the present invention resides in the provision of a solar heating system and solar heating method for animal housing structures wherein solar heat is collected and directed into the ground underlying the structure where the heat is actually dispersed into the earth after which the heat is slowly transferred upward and emitted from ground level into the structure.

Another object of the present invention resides in the provision of a solar heating system and method of the character referred to above wherein the collected solar energy is dispersed underground at such a depth with respect to ground level such that the earth acts as a heat storing medium for the solar energy transferred thereto.

Another object of the present invention resides in the provision of a solar heating system in conjunction with an animal housing structure of the basic character referred to above wherein collected solar energy in the form of heat is dispersed throughout the underlying ground through conduits generally horizontally disposed beneath ground level and inclined such that the inlet ends of said conduits are spaced further from ground level than the outlet ends so that heat can be generally uniformly distributed about the ground level of the housing structure.

A further object of the present invention resides in the provision of a solar heating system for an animal housing structure of the character referred to above that is especially suitable to be retrofitted or installed into existing structures.

A further object of the present invention resides in the provision of a solar heating system and method for an animal housing structure wherein the ground located directly below the housing structure is utilized to store heat therein and is provided with a sealed, insulated barrier.

Also an object of the present invention is to provide a solar heating system and method of heating an animal housing structure with solar energy wherein the same is particularly designed to uniformly heat the floor or ground surface of the structure, thereby concentrating the heat in an about areas occupied by the animals.

A further object of the present invention resides in the provision of a solar heating system in conjunction with an animal housing structure of the character referred to above that is provided with a relatively simple but efficient and effective roof-attic solar energy collector.

It is also an object of the present invention to provide a solar energy heating system for animal housing structures with a control system having a differential thermostat so as to only operate the solar energy collecting system when the useful collected solar energy exceeds a predetermined minimum value.

Other objects and advantages of the present invention will become apparent from a study of the following description and the accompanying drawings which are merely illustrative of the present invention.

SOLAR HEATING SYSTEM FOR AN ANIMAL HOUSING STRUCTURE SUCH AS A BROILER HOUSE

Figure 1:
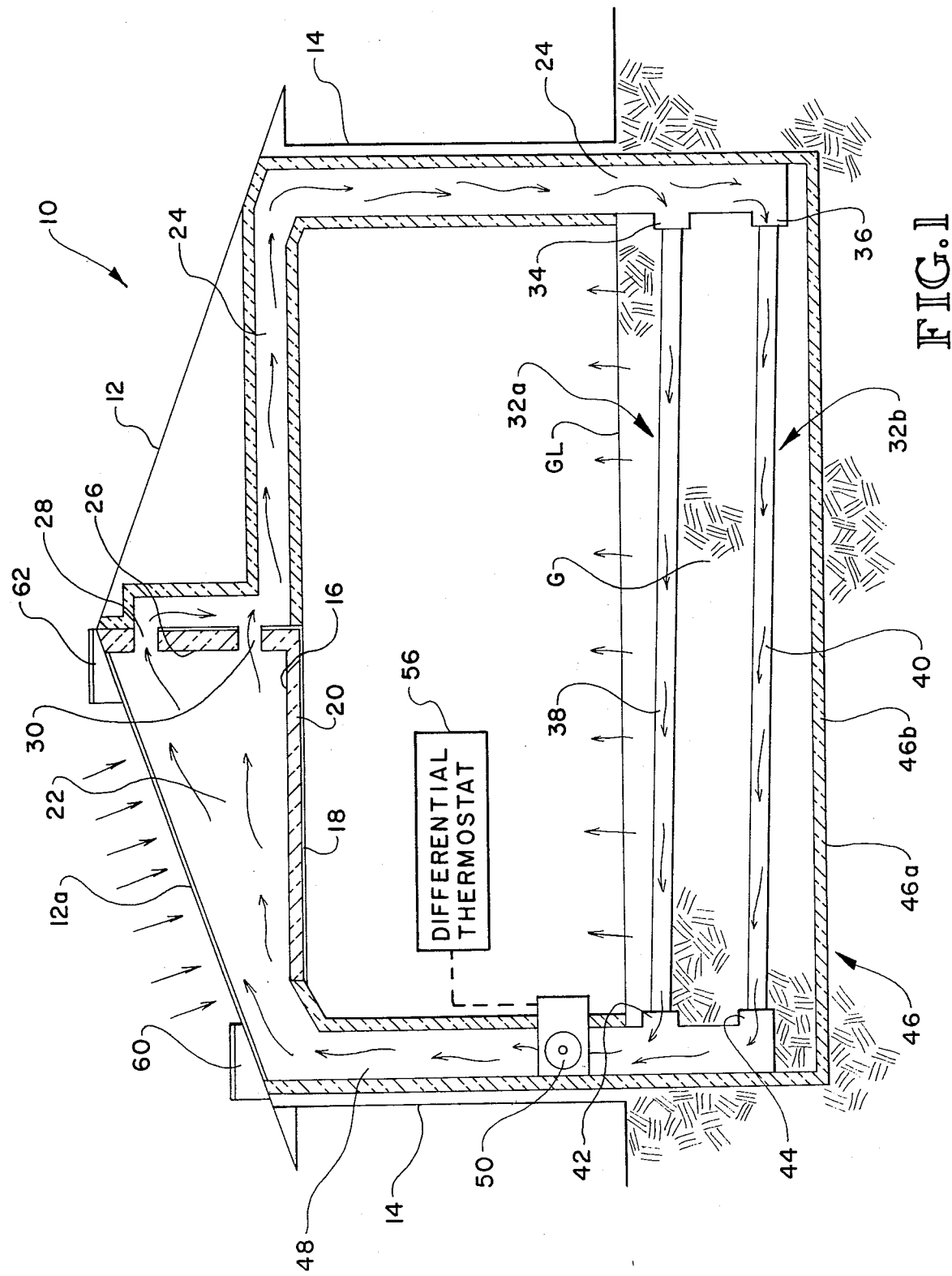
FIG. 1 is a longitudinal sectional view of an animal housing structure having the solar energy heating system of the present invention incorporated therein.

With further reference to the drawings, the solar heating system and associated animal housing structure is shown therein and indicated generally by the numeral 10. From a review and study of the present disclosure, it will be appreciated that the solar heating system and associated structure can be appropriately utilized for many purposes including various types of animal housing structures. In the present disclosure, however, the solar heating system will be generally described and discussed in the context of a broiler house.

With further reference to the drawings, it is seen that the animal housing structure includes a roof 12 and a surrounding wall structure 14.

Defined beneath roof 12 is an animal occupancy area that allows the animals to roam and move thereover while being protected by the enclosed structure. Underlying the structure is the ground G and the upper portion thereof is referred to as ground level GL.

First, attention will be directed to a solar energy collection system forming a part of the present invention. The solar energy collector system disclosed herein is generally referred to as a roof-attic arrangement. For efficiency, the structure herein disclosed is provided with the solar energy collector system about its southern exposure.

Forming a part of the solar energy collector system of the present invention is a transparent roof section 12a that allows solar radiation to pass therethrough. Disposed below transparent roof 12a is a collector 16 that is provided with a black exposed surface. Collector 16 is supported above a ceiling structure 18 with styrofoam insulating board 20 interposed between collector 16 and ceiling 18. Consequently, it is appreciated that there is defined a solar attic heating space 22 between transparent roof 12a and collector 16.

For cooling purposes in the summer, the roof 12 is provided with a closable lower air unit 60 and a closable upper unit 62.

With reference to FIG. 1, it is seen that a delivery duct 24 leads from solar attic heating space 22 to and through the ground G. Interposed between delivery duct 24 and solar attic heating space 22 is an attic partition wall 26 (which also functions as a solar collector) that includes a pair of openings 28 and 30 that would preferably extend substantially the entire width of the structure. Consequently, it is appreciated that passing air moving through solar attic heating space 22 can enter delivery duct 24 via openings 28 and 30.

In order to collect available solar radiation, the solar heating system of the present invention is provided with a blower 50 (one-half horse power or suitable power rating) that is operative to direct a system of air through the solar attic heating space 22 where heat is transferred thereto, and then on into delivery duct 24. In subsequent portions of this disclosure, blower 50 and its control system will be discussed in more detail.

As seen in FIG. 1, delivery duct 24 extends generally horizontally across the building to a side wall 14 where the same turns downwardly towards the ground G. Delivery duct 24 is communicatively connected to an upper inlet manifold 34 and a lower inlet manifold 36.

Disposed within ground G, at a selected depth or depths, is heat transfer means for transferring the solar energy in the form of heat collected by a solar energy collector. In the embodiment disclosed, there is provided within the ground G upper heat transfer means 32a and lower heat transfer means 32b.

Upper heat transfer means 32a is communicatively connected to upper inlet manifold 34 and includes a plurality of upper pipes 38 that extend through the ground G in side-by-side relationship in a generally horizontal plane.

Lower heat transfer means 32b is communicatively connected to lower inlet manifold 36 and includes a plurality of lower pipes 40 disposed within the ground G in side-by-side relationship in a plane generally parallel to the upper pipes 38.

About the outlet end of upper pipes 38 and lower pipes 40, there is provided upper and lower outlet manifolds 42 and 44. As seen in the drawings, pipes 38 and 40 are communicatively associated with upper and lower outlet manifolds 42 and 44 such that air exiting the outlet ends of pipes 38 and 40 can be channeled inwardly to where the upper and lower outlet manifolds communicate with a return duct 48.

Figure 2:
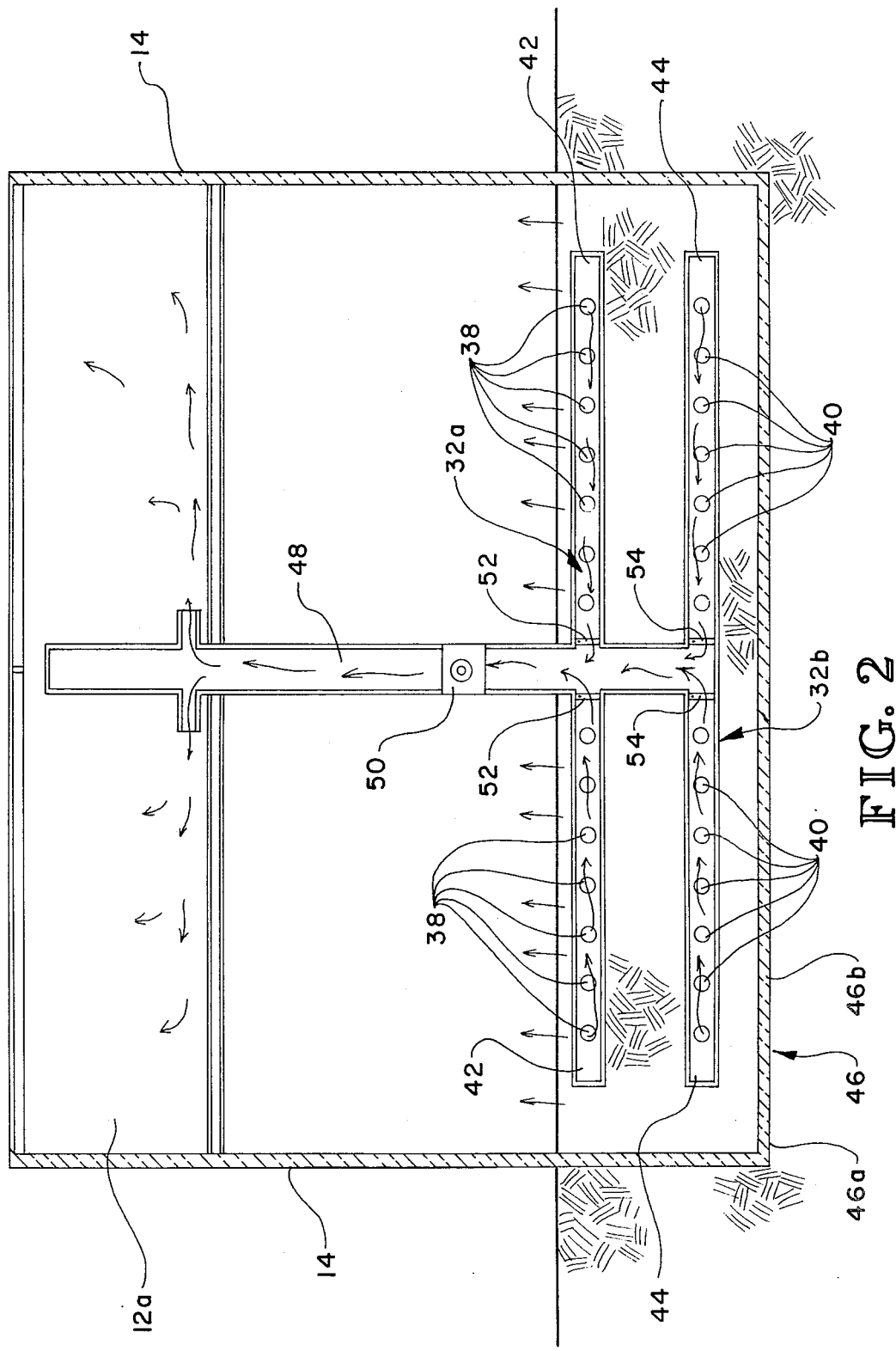
FIG. 2 is a transverse sectional view of the animal housing structure having the solar energy heating system of the present invention incorporated therein.

As illustrated in FIG. 2, a pair of automatic control dampers 52 is provided about each side of said return duct 48 in alignment with the upper outlet manifold 42 for selectively controlling the flow of air from the upper outlet manifold 42 into return duct 48. Likewise, a pair of dampers 54 is provided in operative relationship between lower outlet manifold 44 and return duct 48 for controlling the flow of air from lower outlet manifold 44 to the return duct 48.

Return duct 48 extends upwardly through ground G and along side a side wall 14 of the structure and extends on up through the structure where the same is communicatively connected to the solar attic heating space 22. It is appreciated that blower 50 is interposed within return duct 48 and is operative to circulate air in the clockwise fashion illustrated in FIG. 1.

Enclosing a section of the ground or earth below the structure and particularly enclosing the ground occupied by pipes 38 and 40 is a sealing structure 46. In particular this is to maintain the earth in and around pipes 38 and 40 dry and to insulate that earth area from surrounding earth. Sealing structure 46 can be constructed of various materials but it is envisioned that one appropriate approach would include a hydro-carbon rubber lining 46a, such as Nordel, provided outwardly of a styrofoam insulating board material 46b (FIG. 1).

In operation the upper heat transfer pipes 38 are placed relatively close to ground level GL. Thus, it is appreciated that solar energy in the form of heat transferred to air passing through the solar attic heating area 22 may be transferred via delivery duct 24 to upper pipes 38. As the heated air passes from right to left (as viewed in FIG. 1) through pipes 38 it is appreciated that heat associated therewith is transferred to the adjacent earth. Once this heat is transferred to the adjacent earth, it tends to move and be transferred upwardly towards ground level GL. Ultimately this heat is emitted from ground level GL and serves to heat the interior of the structure and particularly the areas of the structure just above ground level. As shown in FIG. 1 that upper pipes 38 are disposed in a plane at an incline to ground level GL. More particularly, as viewed in FIG. 1, the upper pipes 38 tend to be disposed closer and closer to ground level GL as one moves from right to left. This is to compensate and to take into account that the heated air entering the upper pipes 38 will tend to be of a higher temperature at the inlet side (that is the right side adjacent inlet manifold 34) than at the far left side (adjacent the outlet manifold 42). This inclination is intended to result in a generally uniform distribution of heat about the ground level GL of the structure.

The lower pipes 40 comprising the lower heat transfer means 32b are provided for the principal function of providing some form of heat storage for the structure disclosed. By disposing lower pipes 40 at a greater depth than upper pipes 38, it is appreciated that heat transferred to the earth and soil adjacent thereto will tend to be stored within the ground G disposed above lower pipes 40. Over a period of time this stored heat will move upward and will eventually be emitted along ground level GL for purposes of heating. Lower pipes 40 can also be disposed at an incline with respect to ground level GL, just as was the case with upper pipes 38 for the same purpose discussed hereinabove.

Dampers 52 and 54 can be controlled automatically or semi-automatically to provide the optimum heat to the ground. In this regard by closing dampers 54, it is appreciated that heat is only transferred to the ground by upper heat transfer means 32a. Conversely by closing dampers 52, heat is only transferred to the ground by the lower heat transfer mens 32b. Obviously by opening both sets of dampers 52 and 54, heat is transferred at both levels.

A differential thermostat 56 is operatively connected to blower 50 to control the same. The solar energy collecting system should be operated only when the useful collected solar energy exceeds a selected value. This is accomplished by comparing the temperature of the air in the solar attic heating space 22 with the temperature of the soil in a selected part of the soil heat storage tank or some other selected reference temperature such as the temperature at ground level GL. It is contemplated that fan or blower 50 would only be operated when the temperature differential exceeds a set value of approximately ten degrees Fahrenheit. A shut-down value of about three to five degrees Fahrenheit would be utilized.

Therefore, it is appreciated that the solar energy heating system and associated structure 10 of the present invention is useful in utilizing solar energy in the form of heat for actually heating the animal housing structure. Of principal importance is the fact that the present invention utilizes the underlying earth as a storage and heat transfer medium. Upper heat transfer means 32a is spaced so as to yield direct or generally immediate heat to ground level GL. This is particularly important inasmuch as the heat emitted tends to hover or stay very close to ground GL where it is actually needed. This is to be contrasted with a gas heating system, for example, where the heat tends to move upward and often is quite ineffective in providing real heat and warmth to the animals.

In addition, of importance in the present invention, is the provision of the soil heat storage tank which enables solar energy in the form of heat to be stored for subsequent use. From a review of the above specification and discussion, it is appreciated that the present invention has the capability of carrying forth the objects enumerated under summary and objects of the invention.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A solar farm animal house adapted to house farm animals such as broilers and the like and to collect solar energy for heating said house, comprising:

A. an animal housing structure overlying a ground area and including an exposed earthen floor having an earthen surface for supporting animals thereon;

B. a solar collecting system associated with said housing structure for collecting available solar energy, said solar energy collecting system including means for directing a fluid medium through the same where solar energy in the form of heat may be readily transferred to said fluid medium;

C. underground heat transfer means for heating said farm animal housing structure via and through the earth underlying said farm animal housing structure;

D. connecting means operatively interconnected between said solar energy collecting system and said underground heat transfer means for transferring collected solar energy in the form of heat from said solar energy collecting system to said underground heat transfer means;

E. said underground heat transfer means being buried and disposed at a selected depth within the earth underlying said farm animal housing structure and including means for transferring heat upwardly from the underground heat transfer means through the overlying earth and upwardly through said exposed earthen floor such that heat is emitted from the surface of the earthen floor and provides heat for farm animals supported and moving over said earthen floor; and F. said underground heat transfer means and the means for transferring heat upwardly through the overlying earth including conduit means operatively connected to said connecting means that interconnects said solar energy collecting system with said underground heat transfer means and wherein said conduit means is buried and disposed at a selected depth within the earth underlying said housing structure and extends generally horizontally through the ground wherein said conduit means is generally uniformly spaced through the earth underlying said housing structure for emitting heat generally uniformly through the surface of said exposed earthen floor.

2. The solar energy heated animal house of claim 1 wherein said solar energy collecting system includes an outer transparent panel and an inner spaced collector with a black surface and wherein there is defined a fluid passing area between said transparent panel and said collector for allowing fluid to pass therethrough resulting in solar energy in the form of heat collected by the solar energy collecting system being transferred to the passing fluid.

3. The solar energy heated animal housing structure of claim 1 wherein said conduit means includes inlet and outlet ends and wherein said fluid medium during the heating operation flows into said inlet ends and out of said outlet ends of said conduit means; and wherein said conduit means is disposed at a slight angle with respect to said earthen surface such that the distance between said conduit means and said earthen surface generally decreases from said inlet end to said outlet end so as to give rise to a generally uniform temperature distribution within said housing structure.

4. The solar energy heated animal house of claim 1 provided with underground sealing means enclosing a volume of earth underneath said structure and generally enclosing said conduit means disposed underground, said sealing means extending downwardly into the earth and around the earth containing said conduit means.

5. The solar energy heated animal house of claim 1 wherein said conduit means includes a plurality of laterally spaced conduits that extend generally horizontally through the ground underlying said animal house structure and wherein said fluid medium is directed through said conduits resulting in heat associated with said fluid medium being transferred to the adjacent earth.

6. The solar energy heated animal house of claim 5 wherein said underground heat transfer means is of a multi-level design and includes a first set of laterally spaced conduit means disposed underground relatively close to earthen floor such that heat transferred therefrom is effective for heating the structure within a relatively short time after the heat is transferred to the earth, and a second set of laterally spaced conduit means disposed below said first set of conduit means and relatively far from said earthen floor compared to said first set of conduit means and which may be effective to store heat within the earth lying between said earthen floor and said second set of conduit means for a period of time before the heat thereof effectively reaches said earthen surface.

7. The solar energy heated animal housing structure of claim 6 wherein there is provided damper means for selectively controlling the flow of fluid to either said first set of conduit means or to said second set of conduit means, or to both.

8. The solar energy heated animal housing structure of claim 7 wherein said plurality of conduits comprising said underground heat transfer means includes inlet ends and outlet ends with said inlet and outlet ends being provided about opposite ends of said conduits, and wherein there is provided a transverse manifold communicatively connected between respective inlet ends and between respective outlet ends for conveniently directing said fluid medium to and from said heat transfer means.

9. A method for collecting solar energy and utilizing the same to heat a farm animal structure such as a broiler house of the type having a roof and an exposed earthen floor including an earthen surface for supporting farm animals thereon, said method comprising the steps of:
  A. collecting solar energy about the structure and transferring the heat associated with said solar energy to a fluid medium;
  B. directing the solar heated fluid medium to and through the earth underlying said farm animal housing structure;
  C. channeling the heated fluid medium generally horizontally through the earth underlying said farm animal housing structure and the earthen floor thereof;
  D. channeling the heated fluid medium generally uniformly throughout portions of earth underlying the earthen floor of said farm animal housing structure;
  E. wherein the step of channeling said heated fluid medium through said underlying earth includes the step of directing conduit means generally horizontally through the earth underlying said farm animal housing structure and surrounding said conduit means with actual earth and directing said heated fluid medium through said conduit means; and
  F. as said heated fluid medium is channeled through the earth, transferring heat from said solar heated fluid medium to the earth disposed over the area where said fluid is being channeled, and then transferring this heat directly upwardly through the overlying earth and directly through the surface of said earthen floor and emitting the solar collected heat from the surface of said earthen floor to provide heat for farm animals moving about the earthen floor.

10. The method of claim 9 including the step of directing the conduit means and heated fluid medium to at least two separate underground levels within the earth underlying said animal housing structure with these two levels being referred to as upper and lower levels with said upper level being disposed underground and below ground level but relatively close to ground level while said lower level is disposed below said upper level and relatively far from said ground level; and selectively transferring heat from said heated fluid medium to earth areas adjacent said upper and lower levels wherein heat transferred to said lower underground level tends to assume a storage function as the same cannot be transferred from the ground as quickly as heat energy transferred to the earth by said upper level.

* * * * *